July 7, 1964

C. L. MOORMAN 3,139,784

PLASTIC FASTENER HAVING DOUBLE TAPERED POINT

Filed June 22, 1961

INVENTOR.
Cletus L. Moorman
BY
*Albert H. Reuther*
His Attorney

United States Patent Office 3,139,784
Patented July 7, 1964

3,139,784
PLASTIC FASTENER HAVING DOUBLE
TAPERED POINT
Cletus L. Moorman, Trotwood, Ohio, assignor to General
Motors Corporation, Detroit, Mich., a corporation of
Delaware
Filed June 22, 1961, Ser. No. 118,918
1 Claim. (Cl. 85—5)

This invention relates to an article of manufacture and, more particularly, to a fastening device having predetermined structural features to facilitate use thereof during mass production assembly procedures requiring speed and accuracy as well as reliability.

An object of this invention is to provide a new and useful fastening device made exclusively of plastic material and having specific improvements therewith for assuring proper mounting and retention thereof along a peripheral edge of an apertured mounting panel such as on a motor vehicle body subject to mass production assembly techniques.

Another object of this invention is to provide a plastic fastening device having a body including a substantially cup-like head portion to fit complementary to an undercut cavity in an elongated elastomeric sealing strip and having a shank portion integral on one side of the head portion, the shank portion having a double-tapered free end which projects from the strip and aids in both guiding and straightening the shank portion axially into peripheral locking engagement established by concentric ring means adapted to hold the fastening device with the sealing strip on one side of an apertured mounting panel such as on a motor vehicle.

Another object of this invention is to provide in combination a plastic nail-like fastening device having a body including a substantially cup-like head portion to fit complementary to an extruded elastomeric sealing strip having a cavity into which the head portion fits and can compress the elastomeric sealing strip in part snugly against one side of an apertured mounting panel, the fastening device further having a shank portion integral with the head portion and provided with relatively fragile concentric locking ring means adapted to grip a cylindrical peripheral surface of a rough-edged aperture in a metal mounting panel only after first and second tapered and conically shaped surfaces of a free end of the shank portion have guided and straightened the fastening device to fit substantially axially into the aperture so as to avoid damage and stripping of the concentric locking ring means due to possible misalignment thereof during force fit of the ring means into engagement with the rough-edged aperture.

A further object of this invention is to provide a fastening device having a nail-like body of plastic material such as molded polyethylene, Delrin or acetal resin which is a highly crystalline and stable form of polymerized formaldehyde, nylon or long chain synthetic polyamide having recurring amide groups, Teflon or polytetrafluoroethylene as well as relatively stiffer though somewhat resilient phenolic materials and the like including a cup-like head portion and shank-like stem portion integral with each other such that a pilot-like free end of the stem portion purposely has a conical and severely tapered first surface which flares laterally outwardly to a diameter that is substantially less than diameter of a mounting-panel aperture and which adjoins a second slightly-tapered annular surface which flares laterally outwardly from a diameter slightly less than diameter of the aperture to a diameter slightly greater than diameter of the aperture having a peripheral surface with rough edges snugly engaged by concentric locking ring means in an intermediate location along the stem portion between the double tapered free end thereof and opposite integral head portion, the concentric locking ring means also having a diameter slightly greater than that of the aperture so as to fit snugly therein though avoiding possible damage to the concentric locking ring means by protective guiding and straightening for axial fit to the aperture as the latter is first encountered by the first and second tapered surfaces adjoining each other.

Another object of this invention is to provide a fastening device having a nail-like body of resilient and moldable plastic material including a cup-like head portion and shank-like stem portion integral with each other such that a pilot-like free end of the stem portion purposely has a conical and severely tapered first surface which flares laterally outwardly in a slope approaching substantially 45° to terminate in an annular juncture with an adjoining second and only slightly tapered annular surface, the juncture having a diameter less than that of a rough-edged aperture in a mounting panel, and a plurality of concentric locking ring means provided each to have a diameter slightly greater than that of the aperture for snug fit to the panel having the aperture, the first and second tapered surfaces providing guidance and axial straightening respectively of the stem portion immediately prior to snug fit of the concentric locking ring means in engagement with the periphery of the aperture in the panel while the head portion compresses an elastomeric sealing strip at least in part on one side of the panel though holding the strip in place under tension along an undercut of the sealing strip.

Further objects and advantages of the present invention will be apparent from the following description, reference being had to the accompanying drawings wherein a preferred embodiment of the persent invention is clearly shown.

In the drawings:

FIGURE 2 is a fragmentary cross-sectional view of the fastening device installed relative to an elastomeric sealing strip for mounting on one side of an apertured panel of a vehicle and the like.

Figure 1:
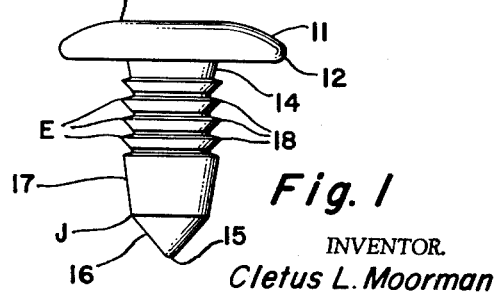
FIGURE 1 is a side view of a fastening device in accordance with the present invention.

In FIGURE 1 there is shown an article of manufacture or fastening device having features in accordance with the present invention and indicated generally by numeral 10. This fastening device 10 is adapted for use in positioning and mounting of an elastomeric sealing strip similar to a type disclosed in U.S. Patent 2,720,685, Harris, belonging to the assignee of the present invention. During mass production of motor vehicles there is need for reliable mounting of elastomeric sealing strips peripherally along junctures between a door or deck lid of an automotive vehicle. Various metal fastening means have been tried and used and difficulty is encountered during positioning of such fastening means to correspond with apertures or rough-edged holes in a sheet metal mounting panel. Such elastomeric sealing strip means can also be provided on domestic appliances such as around a refrigerator door and the like and an inexpensive though accurate and reliable fastening device which can be quickly manipulated and positioned for mounting such a sealing strip is provided in accordance with the present invention.

The fastening device 10 has a nail-like body of plastic material which is moldable, resilient and slightly deformable under ordinary temperature conditions. For example, the plastic material of the fastening device 10 can be polyethylene as well as Delrin or acetal resin which is a highly crystalline and stable form of polymerized formaldehyde commercially available and having metal-like mechanical properties including a high degree of strength and rigidity as well as considerable dimensional stability, tensile and flexural strength. Delrin retains resilience and toughness as well as these other desirable properties even under varying conditions of temperature, humidity, stress and the like. Delrin can be injection molded to close tolerances which contribute to success of the fastening device 10 in accordance with the present invention including structural features pointed out more clearly in the following description. It is to be noted that other suitable plastic materials can be used including Teflon or polytetrafluoroethylene as well as relatively stiffer though somewhat resilient phenolic materials and the like.

The fastening device 10 includes a cup-like head portion 11 having a laterally outwardly and downwardly extending peripheral edge portion 12. Centrally the head portion 11 is integral with a shank-like stem portion 14 extending substantially axially to a free end 15 remote from the head portion 11. Specific structural features integral with the shank or stem portion 14 can be seen in the drawings.

In accordance with the present invention the stem portion 14 must include both a first tapered and conically shaped surface 16 as well as a second tapered and conically shaped surface 17. An annular juncture J is located in a position where the first and second tapered surfaces 16 and 17 adjoin each other. The slope or angular relationship of the tapered surfaces is dissimilar so as to form the juncture J along a toroidal intersection of the surfaces 16–17. In addition to the pair of differing tapered surfaces 16 and 17, the stem portion 14 is provided with a plurality of concentric locking ring means 18 having radially outer edges E which are relatively sharp though fragile and subject to damage by shearing unless the stem portion 14 is provided with the first and second tapered surfaces 16 and 17. Such ring means 18 can be located longitudinally or axially in spaced relationship to each other as well as axially and concentrically coinciding with a center line or axis of the stem portion 14 about which the first and second conical surfaces 16 and 17 are generated to define the juncture J therebetween.

Figure 2:
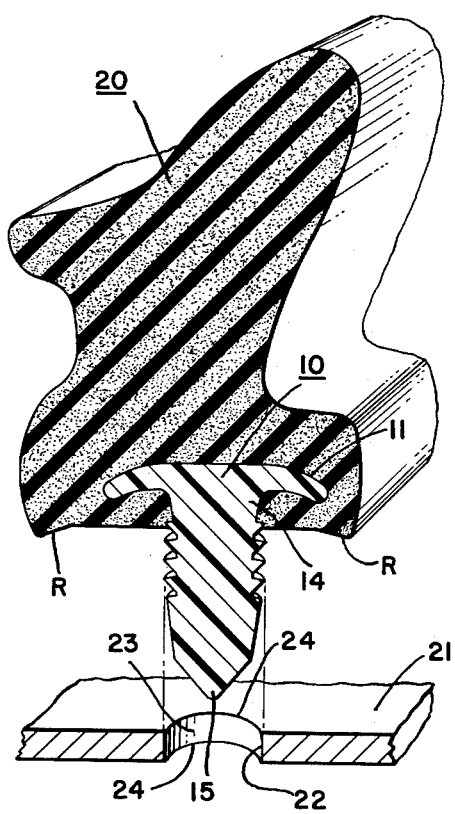
Figure 3:
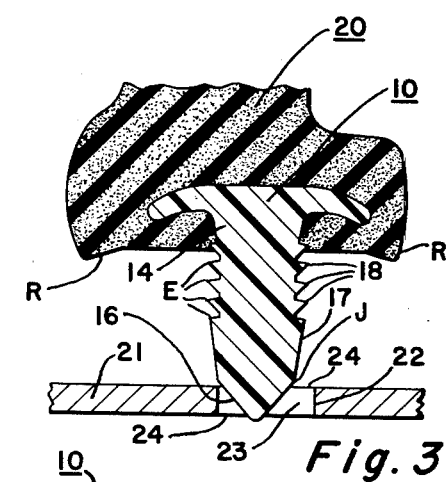
FIGURE 3 shows guiding of the fastening device and strip relative to the panel and FIGURE 4 shows the fastening device, strip and panel in assembled relationship.
Figure 4:
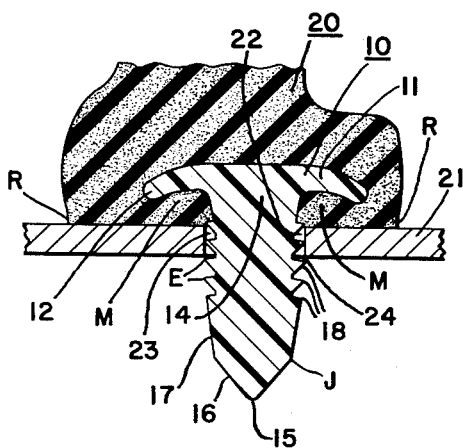

In views of FIGURES 2, 3 and 4 the fastening device 10 in accordance with the present invention can be seen installed relative to an elastomeric sealing strip means generally indicated by numeral 20 and formed by extrusion or molding to include an undercut cavity longitudinally adjacent to one side thereof. Details of this sealing strip 20 can also be seen in a disclosure of an application S.N. 126,419, Harris et al., filed concurrently herewith and belonging to the assignee of the present invention. In this application, S.N. 126,419, Harris et al., there is disclosed an apparatus and method for installing plastic fastening devices 10 in sealing strips such as 20 made of elastomeric material.

Also visible in each of the views of FIGURES 2, 3 and 4 there can be seen a fragment of a mounting panel 21 such as on a motor vehicle body or refrigerator cabinet or door provided with a hole or rough-edged aperture 22 providing an annular peripheral surface 23 in between opposite edges 24. It is to be understood that a plurality of the fastening devices 10 can be positioned and retained relative to an undercut cavity extending longitudinally along one side of the sealing strip 20 and that a predetermined spacing substantially coinciding with spacing of apertures 22 in the mounting panel 21 can be established and maintained. However, due to flexibility and resilience of the sealing strip, there is sometimes a misalignment of fastening means relative to apertures such as 22 in a mounting panel such as 21. FIGURE 2 illustrates the fastening device 10 axially in alignment with an aperture 22 as would be an ideal situation. However, FIGURE 3 illustrates that misalignment can occur and in such instances the free end 15 can be moved into the aperture 22 while the first tapered surface 16 effects general centering of the stem portion 14. Thus a guiding or centering as effected by the first tapered surface 16 results in accurate pre-positioning of the fastening device 10 until the juncture J is reached. The juncture J has a diameter substantially less than diameter of a mounting-panel aperture 22 as can be best seen in FIGURE 3.

Once the fastening means 10 as carried by the sealing strip 20 passes the juncture J during insertion thereof through the aperture 22 the outwardly tapered secondary surface having a generally truncated conical shape effects a straightening of the stem portion 14 relative to the aperture 22 such that an annular end of the secondary surface 17 terminating adjacent to the ring means 18 is provided with a diameter slightly greater than diameter of the aperture and the sharp radially outer edges E of the ring means 18 fit concentrically and snugly into engagement with an inner peripheral surface such as 23 of the aperture 22 without any damage such as due to shearing and the like that would occur if the stem portion 14 were inserted angularly rather than axially relative to the aperture in the mounting panel.

FIGURE 4 illustrates the fastening device 10 as carried by the elastomeric sealing strip 20 in assembled relation and in sealing engagement on one side of the panel 21. The sealing strip 20 includes a pair of longitudinally extending and laterally spaced ribs R projecting downwardly and these ribs R are visible in a free state in FIGURES 2 and 3 of the drawings. In FIGURE 4 of the drawings the ribs R have been deformed due to compression of elastomeric material M along an underside of the cup-like head portion 11 including the downwardly extending annular edge 12. The ribs R sealingly engage one side of the panel 21 and one or more annular edges E of the ring means 18 snugly engage and bind against the peripheral surface 23 in spite of rough edges such as 24 which can be left surrounding the panel aperture 22 due to stamping or drilling of the aperture in sheet metal of the panel 21. The elastomeric sealing strip 20 includes material M compressed in part below the cup-like head portion 11 so as to seal the aperture 22 on one side of the panel 21 and the ribs R integral with the strip means 20 effect a laterally outwardly located seal relative to the panel 21.

The second tapered or conical surface 17 approaches but does not quite attain cylindrical configuration due to angular relation thereof while the first tapered surface 16 has a much more pronounced angular relationship approaching 45° relative to the center line or axis of the shank or stem portion 14 that collectively includes the ring means 18 as well as the first and second tapered surfaces 16 and 17, respectively. The sealing strip 20 of elastomeric material is firmly held in place by each of a plurality of fasening devices 10 in accordance with the present invention and these devices per se are inexpensive yet practical and efficient to use. It is to be noted that the first and second tapered surfaces 16 and 17 effect guiding and straightening of the fastening devices 10 to be substantially perpendicular to the mounting panel 21 and stripping of the ring means 18 is avoided due to axial positioning of the stem portion 14 relative to the aperture 22. The double tapered surfaces immediately adjacent to the free end 15 of the stem portion 14 can be considered particaularly important since these surfaces sequentially serve as a pilot-like structure to assure proper positioning, insertion and locking of the plastic nail-like fastening device 10 relative to an apertured panel. The ring means 18 along the radially outer edges E thereof have a diameter substantially equal to the diameter of the end of the secondary tapered surface 17 at a location substantially intermediate the stem portion 14 and adjacent to the first or lower one of a series of concentric and axially spaced ring means 18.

Figure 5:
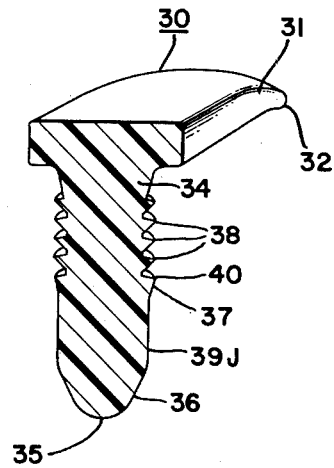
FIGURE 5 shows a slightly modified structure though quite similar to that of FIGURES 1–4.

FIGURE 5 shows a fastening device generally indicated by numeral 30 and having a head portion 31 with a downwardly projecting outer peripheral edge 32 similar to that described for the fastening device 10. The fastening device 30 also includes a shank-like stem portion 34 as well as a free end 35 and a first tapered surface 36. A second tapered surface 37 is provided in a location axially to one side of the first tapered surface 36 and adjacent to concentric ring means 38. A cylindrically extended juncture 39J is provided between the first tapered surface 36 and the second tapered surface 37. This extended cylindrical juncture is similar to the juncture J described earlier in that it represents a diameter less than diameter of an aperture in a mounting panel and is located intermediate the first and second tapered surfaces. The second tapered surface has an annular edge 40 adjacent to the locking ring means 38 and the purpose of the second tapered surface 37 is to effect straightening of the fastening device 30 during insertion thereof relative to an aperture such as 22 in a mounting panel 21. The cylindrically shaped axial extension of juncture 39J assures seating and retention of a fastening device in an aperture 22 so as to avoid possible dislocation of a sealing strip such as 20 having such fastening devices fitted into a cavity thereof.

It is to be noted that head portions 11 and 31 of the fastening devices can have a round button-like shape and can also have an elongated shape to fit into a longitudinally extending cavity provided by the elastomeric sealing strip means 20. In the event an elongated head portion is provided, the cross section thereof will result in a slightly lengthened shape of the head portion such as 31 and there is less danger of accidental dislocation of the head portion 31 from the longitudinally extending cavity of the sealing strip 20. The elongated head portion such as 31 can have a diamond-like configuration or can have an oblong or substantially rectangular shape. Regardless of shape of the head portion, the elastomeric material of the strip is dilated or expanded by forcing apart the elastomeric material around an aperture or hole extending laterally from a cavity in the sealing strip. The aperture or hole has a diameter substantially equal to that of the shank-like stem portions such as 14 and 34 and outer annular edges of the concentric locking ring means such as 18 and 38 fit snugly into tight engagement with a peripheral surface defining the aperture in a mounting panel such as 21.

While the embodiment of the present invention as herein disclosed constitutes a preferred form, it is to be understood that other forms might be adopted.

What is claimed is as follows:

On a nail-like body of solid plastic material exemplified by moldable polyethylene, acetal resin, polyamide and polytetrafluoroethylene as well as phenolic including a solid elongated head portion with a radially outwardly and downwardly extending integral edge to hold a sealing strip of elastomeric material compressed thereunder in part tightly against a rough-edged apertured mounting panel and having a shank-like annular stem portion integral at one end centrally with said head portion and integrally having a free end remote from said head portion with a plurality of continuous axially spaced concentric locking ring means in an intermediate location radially along said stem portion, the improvement which comprises both a first conically tapered surface extending directly from the free end sharply radially outwardly at an angle approaching 45° from axial center line of the stem portion in a location immediately adjacent to the free end for general centering and pre-positioning in the apertured mounting panel, and a second conically tapered surface having a taper substantially less than 45° from the axial center line and approaching a cylindrical configuration, said second surface extending for a distance axially longer than that of said first sharply radially outwardly extending tapered surface, said first and second tapered surfaces being joined along an annular intersection thereof from which said first and second tapered surfaces extend with significantly differing angular relation as to the axial center line of said stem portion, said second tapered surface in a location immediately adjacent to said first tapered surface defining a diameter substantially less than that of any aperture of the panel though said second tapered surface gradually increases structurally solid to a diameter immediately adjacent to the ring means having a diameter slightly greater than that of both the inner diameter of continuous ring means as well as the aperture so that a snug fit for locking engagement is assured between the panel and ring means while the elongated head portion sealingly holds the elastomeric strip on one side of the panel, said second gradually axially longer tapered surface serving to protect said ring means by having structurally solid diameter greater than inner diameter of continuous ring means in immediately adjacent location shielded from internal diameter shearing damage due to non-axial misalignment with rough edges of the panel defining the aperture because the ring means positively can be engaged only outwardly from inner diameter thereof after engagement of said second gradually axially longer tapered surface.

References Cited in the file of this patent

UNITED STATES PATENTS

| 2,596,780 | Meyers et al. | May 13, 1952 |
| 2,780,128 | Rapata | Feb. 5, 1957 |
| 2,896,889 | Hershberger | July 28, 1959 |
| 2,927,497 | Rapata | Mar. 8, 1960 |

FOREIGN PATENTS

| 585,887 | Great Britain | Feb. 27, 1947 |
| 818,548 | Great Britain | Aug. 19, 1959 |